US006149521A

United States Patent [19]

[11] Patent Number: 6,149,521
[45] Date of Patent: Nov. 21, 2000

Sandusski

[54] VIDEO POKER GAME WITH MULTIPLIER CARD

[75] Inventor: Thomas J. Sanduski, Las Vegas, Nev.

[73] Assignee: Sigma Game, Inc., Las Vegas, Nev.

[21] Appl. No.: 09/139,953

[22] Filed: Aug. 25, 1998

[51] Int. Cl.[7] ........ A63F 13/00

[52] U.S. Cl. ........ 463/13; 463/11; 463/12; 463/16; 463/17; 273/143 R

[58] Field of Search ........ 463/11–13, 16–17, 463/22, 15–18; 273/143 R, 274, 292

[56] References Cited

U.S. PATENT DOCUMENTS

| | | | |
|---|---|---|---|
| 5,033,744 | 7/1991 | Bridgeman et al. | 273/85 CP |
| 5,085,436 | 2/1992 | Bennett | 273/143 R |
| 5,100,137 | 3/1992 | Fulton | 273/85 CP |
| 5,255,915 | 10/1993 | Miller | 273/85 CP |
| 5,294,120 | 3/1994 | Schultz | 273/85 CP |
| 5,415,404 | 5/1995 | Joshi et al. | 273/138 |
| 5,511,781 | 4/1996 | Wood et al. | 273/85 CP |
| 5,531,441 | 7/1996 | Dabrowski et al. | 463/12 |
| 5,542,669 | 8/1996 | Charron et al. | 463/13 |
| 5,639,088 | 6/1997 | Schneider et al. | 273/138.2 |
| 5,655,961 | 8/1997 | Acres et al. | 463/27 |
| 5,823,873 | 10/1998 | Moody | 463/13 |
| 5,833,537 | 11/1998 | Barrie | 463/21 |
| 5,876,284 | 3/1999 | Acres et al. | 463/25 |
| 5,947,821 | 9/1999 | Stone | 463/16 |
| 5,984,779 | 11/1999 | Bridgeman et al. | 463/16 |

FOREIGN PATENT DOCUMENTS 2097160 10/1982 United Kingdom .

*Primary Examiner*—Jessica J. Harrison
*Assistant Examiner*—Carmen D. White
*Attorney, Agent, or Firm*—Skjerven Morrill MacPherson LLP; Brian D. Ogonowsky

[57] ABSTRACT

A video poker gaming machine is described where a base amount for a poker hand is multiplied by the value of a multiplier card. In one embodiment, the poker hand is four-of-a-kind and the multiplier card is the kicker card.

28 Claims, 3 Drawing Sheets

VIDEO POKER GAME WITH MULTIPLIER CARD

FIELD OF THE INVENTION

This invention relates to gaming machines and, in particular, to a video poker gaming machine.

BACKGROUND

Video poker machines used for gaming are well known in the art. Most video poker gaming machines used in casinos implement conventional rules for poker by dealing five cards face up and allowing the player to hold any number of the cards. When the player then presses a draw button, the discarded cards are replaced with new cards. A payout table cross-references the resulting hand with a win amount, and the player is paid accordingly.

What is needed is a video poker gaming machine which has more appeal than the conventional video poker gaming machines so that such a machine will be played more often to generate more revenue to the casino, resulting in increased sales of such a video poker machine.

SUMMARY

In one embodiment of a video poker machine in accordance with the present invention, if the player obtains four-of-a-kind, the base award for the four-of-a-kind hand is multiplied by the value of the remaining card (the kicker). For example, if the base award for four-of-a-kind is 100 coins, and the kicker is a 7, then the resulting payout is 700 coins. In one embodiment, jacks, queens, and kings have a value of 10. An ace can have a predetermined value, or the ace can be given a randomly selected multiplier value.

Such an advantage given to the player results in greater player interest and increased play of the video poker machine.

In other embodiment, the player is given the opportunity to replace the multiplier card with a card to be randomly selected from the deck to obtain a higher multiplier. In another embodiment, the multiplier card applies to other than a four-of-a-kind hand. In another embodiment, a designated multiplier card is dealt in addition to a five-card hand and can be applied in various ways to the hand.

DETAILED DESCRIPTION OF THE EMBODIMENTS

Figure 1:
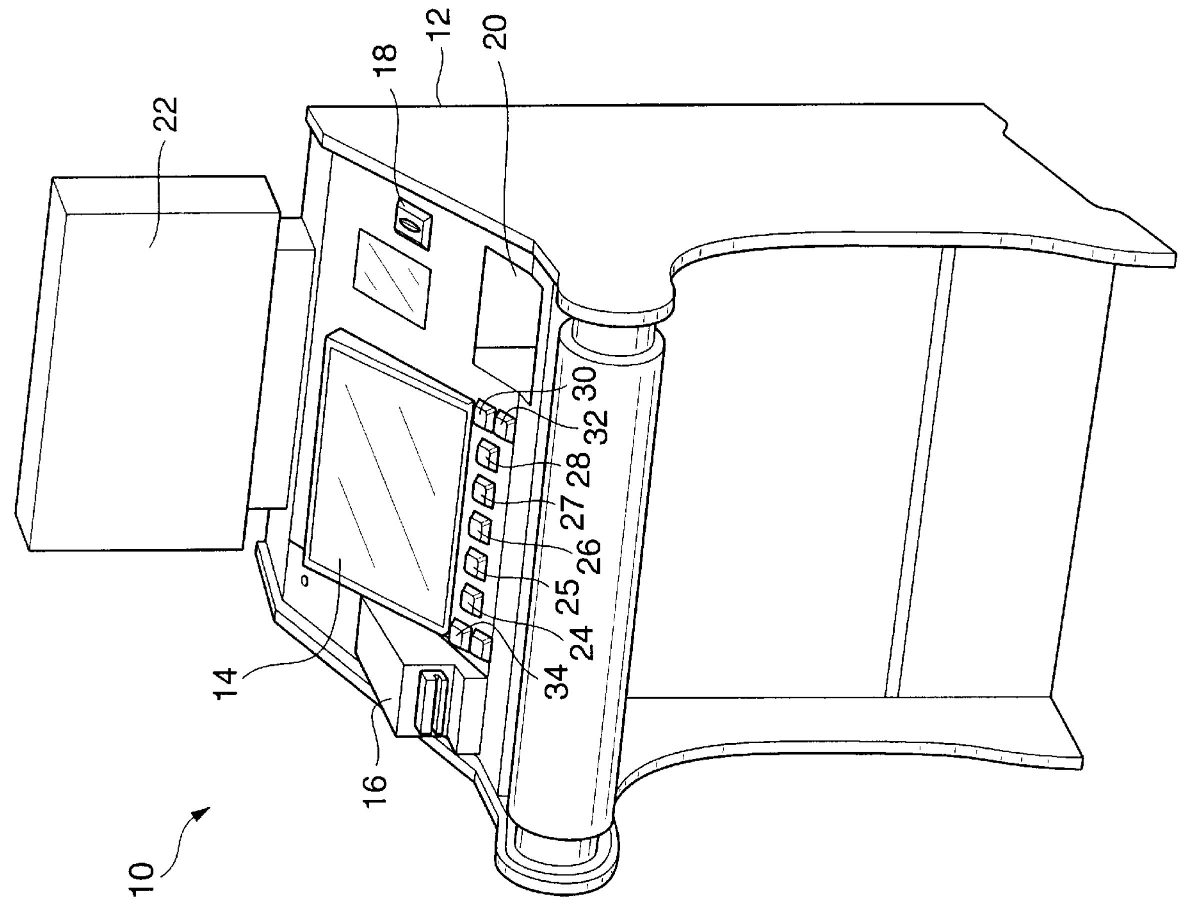
FIG. 1 illustrates a slant-top video poker machine incorporating the present invention.

FIG. 1 illustrates one of the many embodiments of a video poker gaming machine which incorporates the present invention. The particular machine shown in FIG. 1 is a slant-top video gaming machine 10 at which the user may sit and play the machine for extended periods. Gaming machine 10 consists primarily of a housing 12, a CRT or LCD screen 14 or other display device, a bill verifier 16, a coin input 18, a payout tray 20, display glass 22 identifying the payouts for various hands and other information, hold buttons 24–28 for holding particular cards, a draw button 30, a bet button 32, and a deal button 34.

The outer design of the gaming machine 10 and the control inputs are conventional. Further, the electronic hardware used to implement the present invention is also conventional. The main difference between the present invention and conventional video poker gaming machines resides primarily in the award memory (also referred to as a payout table), which determines the award to be paid to a player. Such circuitry will be described later with respect to FIG. 3.

Various patents, incorporated herein by reference, describing video poker gaming machines are cited below to illustrate the level of skill in the art and to illustrate that an adequate disclosure of a software modification to existing video poker gaming machines may consist of describing the high level operation of the machine rather than circuitry details of a conventional design. These patents include U.S. Pat. Nos. 5,542,669; 5,531,441; 5,511,781; 5,100,137; and 5,033,744. Such patents also illustrate the crowded field of video poker gaming machines.

The playing of a game will be described with reference to FIGS. 2, 3, and 4.

To begin a game, the player inserts coins or bills into the gaming machine 10. The player then places a bet by depressing button 32 a desired number of times. A game is now initiated, shown as step 1 of FIG. 4.

Figure 3:
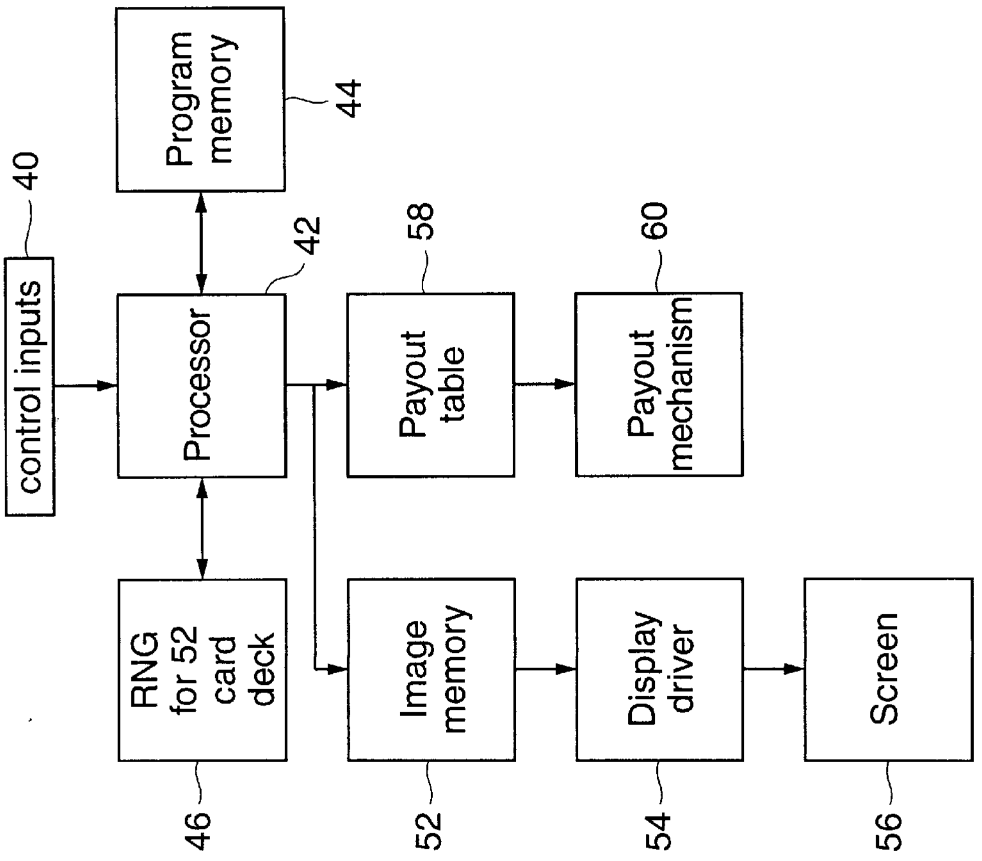
FIG. 3 illustrates the relevant functional blocks which may be used to implement the present invention.
Figure 4:
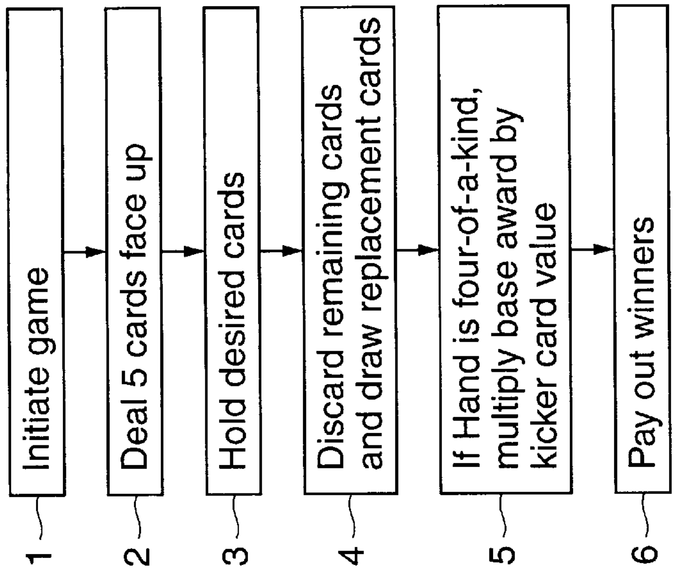
FIG. 4 is a flowchart illustrating the basic steps which may be used in the present invention.

The player then presses the deal button 34 to cause the machine 10 to deal five cards 35, 36, 37, 38, 39 face up, shown as step 2 of FIG. 4. The various buttons and other inputs illustrated in FIG. 1 are termed control inputs 40 in FIG. 3.

A processor 42 receives instructions from a program memory 44 for carrying out the play of the game. The hardware illustrated in FIG. 3 may be conventional, with the difference between the prior art and the present invention being the software code incorporated into payout table 58. Payout table 58 may be a ROM or other memory device external to or part of processor 42. The selection of cards from a fifty-two card deck is made using a random number generator 46 of conventional design. The random number generator 46 may be included in program memory 44. Thus, the five cards 35–39 displayed on screen 14 are dealt at random to emulate an actual poker game.

The display of the cards on screen 14 is performed in a conventional manner. A code generated by processor 42 in FIG. 3 is converted into the relatively complex pixel pattern of a card by an image memory 52. Image memory 52 may be conventional and identifies the illumination levels of the various pixels on screen 14 to create the image displayed to the player.

A display driver 54 converts the output of image memory 52 into electrical signals for the screen 14.

In the next step of the game, the player pushes any combination of the hold buttons 24–28 to hold one or more of the five initially dealt cards, shown as step 3 in FIG. 4.

The player then presses the draw button 30 to replace the cards which were not held, shown as step 4. The replacement cards are randomly selected by the random number generator 46.

At this time, the player's final hand is displayed on the screen 14, and a payout, if appropriate, is then awarded. Referring to FIG. 3, the processor 42 keeps track of the player's hand, and the displayed combination is applied to a payout table 58, which cross-references the combination of cards to a player's winnings.

Figure 2:
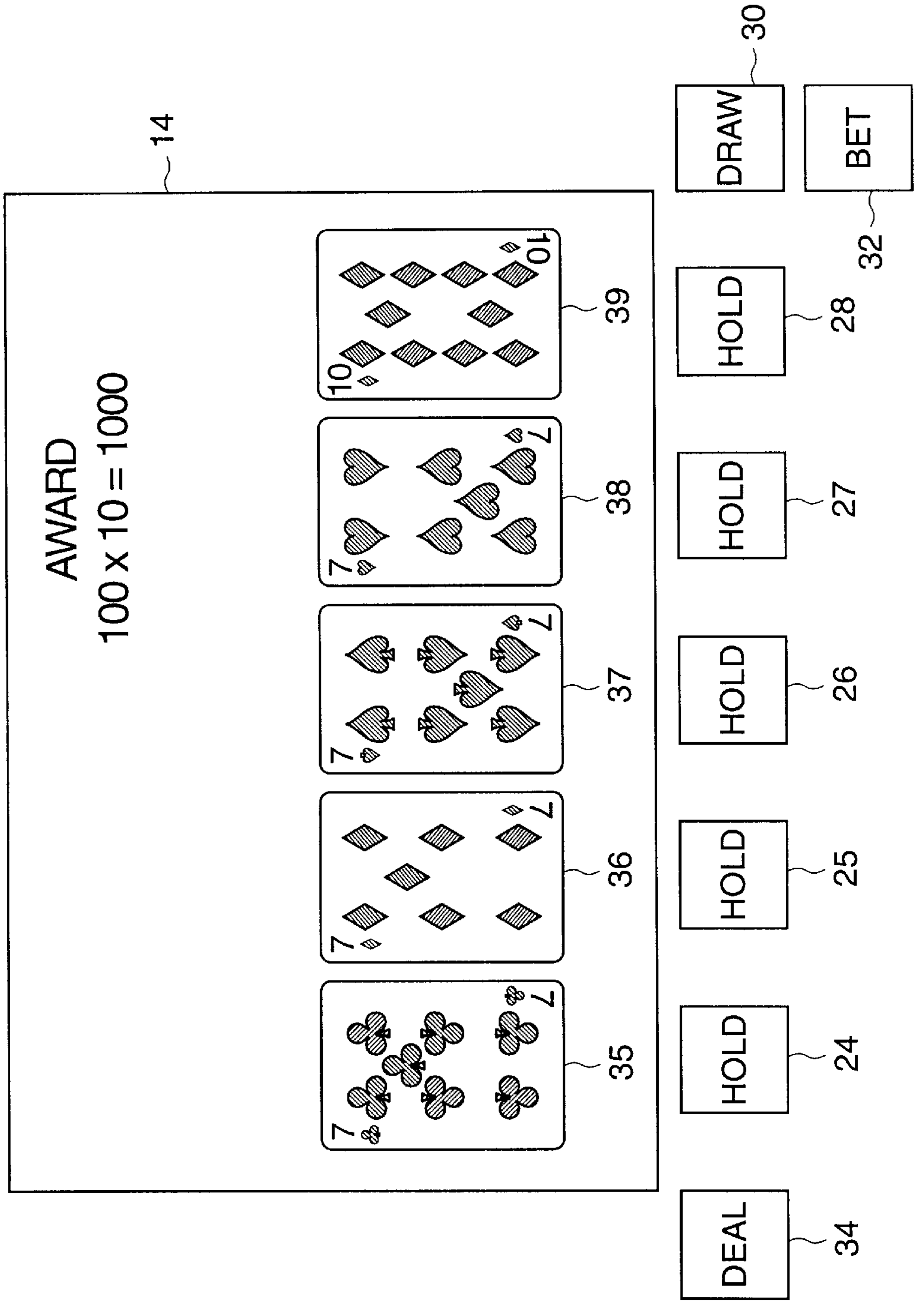
FIG. 2 shows one example of the displayed cards at the end of a game.

If four-of-a-kind is obtained in the final hand, as shown in FIG. 2, the kicker card 39 will act as a multiplier of the base award for a four-of-a-kind hand, as shown in step 5 of FIG. 4.

The payout table 58, in one embodiment, contains all possible combinations of four-of-a-kind with a kicker card and cross-references the applicable combination with an award value. In another embodiment, an award multiplier circuit operates in conjunction with a conventional payout table to multiply a base award by the kicker value.

In the example shown in FIG. 2, four sevens were obtained, and the kicker card is a ten. Assuming the base award for four-of-a-kind is 100 coins, for a one coin bet, the payout will be 1000 coins.

In one embodiment, jacks, queens, and kings have a value of ten.

A payout signal is then applied to a conventional payout mechanism 60 for paying out the appropriate number of tokens or by crediting the player, shown as step 6 of FIG. 4.

The resulting game adds a new level of suspense for the player. For example, if the player is dealt three-of-a-kind, the player can have high hopes for getting four-of-a-kind with a 10×multiplier kicker. Additionally, if the player is dealt four-of-a-kind, the player can discard the fifth card, gambling for a higher value multiplier. The ace may be given a predetermined multiplier value (e.g., 1or 11) or a random value.

In one embodiment, after the completion of a hand, the player is given the option to stick with the present multiplier card value or be dealt a replacement multiplier card with the hope of obtaining a higher multiplier value. If the player opts for a replacement multiplier card, the multiplying value of the replacement multiplier card is then used to multiply the award for the previously obtained poker hand. In another embodiment, if the replacement multiplier card is not a higher multiplier, the player gets no award, or the original multiplier, or no multiplier for the poker hand.

The option to draw a replacement multiplier card after the normal poker game is over in an attempt to obtain a higher multiplier may be made into a secondary game. As an example, after the game is over, the player may be dealt five cards face down, where the player can select one card as a replacement multiplier card. This secondary game may be conducted on a special event screen.

The above-described concepts of using a card to multiply the award for a hand can also be applied to other poker hands.

For example, a five card hand can be dealt along with a sixth card acting as a designated multiplier card. The multiplier card may be applied to designated hands, such as flushes, straights, pairs, etc.

As another example, the sixth card can either be used as a multiplier, or as an extra card to obtain a winning hand, or a combination of both.

In another embodiment, a designated card dealt to a player that is not used in the winning poker hand acts as a multiplier card.

In another embodiment, if the multiplier card is an ace, the multiplying value of the ace is randomly chosen.

The invention generates increased player interest, resulting in increased revenue to the casino and increased sales of the machine.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A video poker gaming machine comprising:

a display device;

a program memory containing a video poker game program;

processing circuitry electrically coupled to said program memory;

display circuitry connected to said processing circuitry and said display device; and a payout device identifying an amount to be paid to a player for a winning combination of cards in a poker hand, said payout device identifying an award for a poker hand as a base award multiplied by a value of a multiplier card in said poker hand displayed on said display device.

2. The machine of claim 1 wherein said program memory contains instructions for carrying out at least the following method performed by said video poker gaming machine:

electronically dealing a player at least five cards, whereby said at least five cards are displayed to said player on said display device;

discarding any cards identified by said player;

replacing each discarded card with a replacement card; and causing a winning combination of cards in said poker hand to pay out winnings to said player in accordance with said payout device.

3. The machine of claim 1 wherein said payout device is a payout memory.

4. The machine of claim 1 wherein said value of said multiplier card is a face value for all cards from 2 through 10.

5. The machine of claim 4 wherein said value of said multiplier card for jacks, queens, and kings is ten.

6. The machine of claim 5 wherein said value of said multiplier card for an ace is a predetermined value.

7. The machine of claim 5 wherein said value of said multiplier card for an ace is a randomly selected value.

8. The machine of claim 1 wherein said multiplier card is a kicker card, said kicker card being a remaining fifth card with a four card winning combination.

9. The machine of claim 8 where said kicker card is a remaining card with a four-of-a-kind winning combination.

10. The machine of claim 1 where said processing circuitry controls said video poker game so that after an initial game, where a winning combination of cards in a poker hand and said multiplier card are displayed, said player is given an option to replace said multiplier card with another randomly selected multiplier card.

11. The machine of claim 10 wherein said processing circuitry controls said video poker game so that, after said initial game, replacement multiplier cards are dealt face down, and said player is given the option to select one of said cards as a replacement multiplier card.

12. The machine of claim 1 wherein said multiplier card is a card within a five-card hand.

13. The machine of claim 1 wherein said multiplier card is a card dealt in addition to a five-card hand.

14. The machine of claim 13 wherein said multiplier card can also be used as an extra card to obtain a winning combination of cards.

15. The machine of claim 1 wherein said multiplier card is a card that is not used in said winning combination of cards.

16. A method performed by a video poker gaming machine comprising:

electronically dealing a player at least five cards, whereby said at least five cards are displayed to said player on a display device;

discarding any cards identified by said player;

replacing each discarded card with a replacement card;

causing a winning combination of cards in a poker hand to pay out winnings to said player, wherein a winning poker hand pays a base amount multiplied by a value of a multiplier card in said poker hand.

17. The method of claim 16 wherein said value of said multiplier card is a face value for all cards from 2 through 10.

18. The method of claim 17 wherein said value of said multiplier card for jacks, queens, and kings is ten.

19. The method of claim 16 wherein said value of said multiplier card for an ace is a predetermined value.

20. The method of claim 16 wherein said value of said multiplier card for an ace is a randomly selected value.

21. The method of claim 16 wherein said multiplier card is a kicker card, said kicker card being a remaining fifth card with a four card winning , combination.

22. The method of claim 21 where said kicker card is a remaining card with a four-of-a-kind winning combination.

23. The method of claim 16 further comprising the step of allowing said player to replace said multiplier card with another randomly selected multiplier card.

24. The method of claim 23 wherein said step of allowing comprises dealing replacement multiplier cards face down and allowing said player to select one of said cards as a replacement multiplier card.

25. The method of claim 16 wherein said multiplier card is a card within a five-card hand.

26. The method of claim 16 wherein said multiplier card is a card dealt in addition to a five-card hand.

27. The method of claim 16 wherein said multiplier card can also be used by said player as an extra card to obtain a winning combination of cards.

28. The method of claim 16 wherein said multiplier card is a card that is not used in said winning combination of cards.

* * * * *